(12) United States Patent
Penn et al.

(10) Patent No.: US 11,014,126 B1
(45) Date of Patent: May 25, 2021

(54) UTILITY CLEANER

(71) Applicants: Shannon Penn, LaPlace, LA (US); Chris Clement, LaPlace, LA (US)

(72) Inventors: Shannon Penn, LaPlace, LA (US); Chris Clement, LaPlace, LA (US)

( * ) Notice: Subject to any disclaimer, the term of this patent is extended or adjusted under 35 U.S.C. 154(b) by 0 days.

(21) Appl. No.: 16/416,165

(22) Filed: May 18, 2019

(51) Int. Cl.
  *A23B 4/30* (2006.01)
  *A23B 7/158* (2006.01)
  *B08B 3/04* (2006.01)

(52) U.S. Cl.
  CPC .......... *B08B 3/04* (2013.01); *A23B 4/30* (2013.01); *A23B 7/158* (2013.01); *A23V 2002/00* (2013.01); *B08B 2203/0211* (2013.01)

(58) Field of Classification Search
  CPC ...... A23B 4/30; A23B 7/158; A23V 2002/00; B08B 3/04; B08B 2203/0211
  USPC .................................. 134/198, 200
  See application file for complete search history.

(56) References Cited

U.S. PATENT DOCUMENTS

| | | | | |
|---|---|---|---|---|
| 2,831,488 A | * | 4/1958 | Anderson | B44D 3/006 134/138 |
| 2002/0166578 A1 | * | 11/2002 | Leblond | B08B 3/045 134/99.2 |
| 2008/0035185 A1 | * | 2/2008 | Baratta | B44D 3/006 134/137 |

* cited by examiner

*Primary Examiner* — Levon J Shahinian
(74) *Attorney, Agent, or Firm* — Andrew G. Vicknair (57) ABSTRACT

A utility cleaner for cleaning a variety of items is disclosed whereby a user can clean a variety of items without having to provide any constant "hands-on" monitoring or actions. A user can hook-up a water supply to the cleaner and allow the cleaner to automatically clean from the force of the supplied liquid and simply visually monitoring the liquid flow out of the cleaner.

12 Claims, 7 Drawing Sheets

UTILITY CLEANER

CROSS REFERENCE TO RELATED APPLICATIONS

This application is not related to any other applications.

TECHNICAL FIELD

The present invention relates, in general to a device utilized to clean a variety of items, including crustaceans such as crawfish, crabs, shrimp, lobsters, and the like, vegetables, fruits, and a variety of other items.

BACKGROUND OF INVENTION

Cleaning various items is a task that is performed on a daily basis using several different techniques and systems for cleaning. Often, the system and method of cleaning an item depends upon the specific item to be cleaned. Edible items that originate from outdoors, such as vegetables, crustaceans, and other similar items, require cleaning before those items are cooked and consumed. However, depending on the nature of the item, one must take care to clean with caution so that the item is not damaged, destroyed, and/or killed before the item is ready to be cooked and consumed. For instance, in dealing with soft vegetables, one has to be careful not to damage the vegetable while cleaning. And when dealing with various crustaceans, such as crawfish, one must be careful not to kill any while cleaning and before cooking and/or consuming.

With respect to crawfish and shrimp, they are two popular crustaceans that are widely consumed and often sought after in various geographic locations, especially in the Southern United States. In fact, shrimp and crawfish are widely sold as gourmet food with a majority of the edible meat found in the tail. Due to the demand for crawfish throughout the United States, it is estimated that the crawfish industry in the Southeastern United States generates more that $300 million in sales yearly through harvesting in wild environments and in farming. Regardless of where or how crawfish or shrimp are sold, they have to be cleaned before they are cooked and consumed. Because crawfish are primarily found in bayous, marshes, swamps, and underground caves, a crawfish's exoskeleton is often covered in mud/dirt and almost always has to be cleaned before they are cooked.

Often crawfish are cleaned by placing crawfish in a short-term saltwater bath for the purpose of purging the crawfish with a goal of cleaning the gastrointestinal tract of the crawfish. Yet, the problem with purging is that crawfish often die when users apply an increased level of salt to the shorty-term bath. Thus, purging of crawfish is avoided by many consumers as they do not want to kill an excess percentage/number of the crawfish being cleaned. Thus, a large number of consumers clean crawfish by subjecting the crawfish to a freshwater bath of varying pressure. Problems with such application is that a user is required to continuously monitor the crawfish through the rinsing process such that the user has to focus on that one task.

While soft vegetables and fruits are cleaned in a variety of ways, individuals often clean such items with water in small batches just before consuming so that the user can maintain control over cleaning and make sure that these items are not damaged while cleaning. Unfortunately cleaning in this method requires constant involvement by the individual.

Accordingly, a need exists in the art for a system that can clean fragile items, such as crawfish, and soft vegetables and fruits, without an individual having to continuously perform and/or monitor the cleaning process.

BRIEF SUMMARY OF THE INVENTION

The present invention is directed to a utility cleaner and method of using the utility cleaner. Use of the utility cleaner will allow a user to clean a variety of items including, but not limited to, live crustaceans, shrimp and items that require sensitivity during cleaning, such as fragile vegetables and fruits such as strawberries, blueberries, blackberries. Thus, a user can use the utility cleaner to clean items that have to be cleaned with sensitivity, such as strawberries, blueberries, blackberries, crawfish and the like without worrying about damaging inanimate objects or worrying about killing animate items, such as crawfish.

The foregoing has outlined rather broadly the features and technical advantages of the present invention in order that the detailed description of the invention that follows may be better understood. Additional features and advantages of the invention will be described hereinafter, which form the subject of the invention. It should be appreciated that the conception and specific embodiment disclosed may be readily utilized as a basis for modifying or designing other structures for carrying out the same purposes of the present invention. It should also be realized that such equivalent constructions do not depart from the invention. The novel features which are believed to be characteristic of the invention, both as to its organization and method of operation, together with further objects and advantages will be better understood from the following description when considered in connection with the accompanying figure(s). It is to be expressly understood, however, that each of the figure(s) is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Referring now in more detail to the drawings, the present invention will now be described in more detail.

Figure 1:
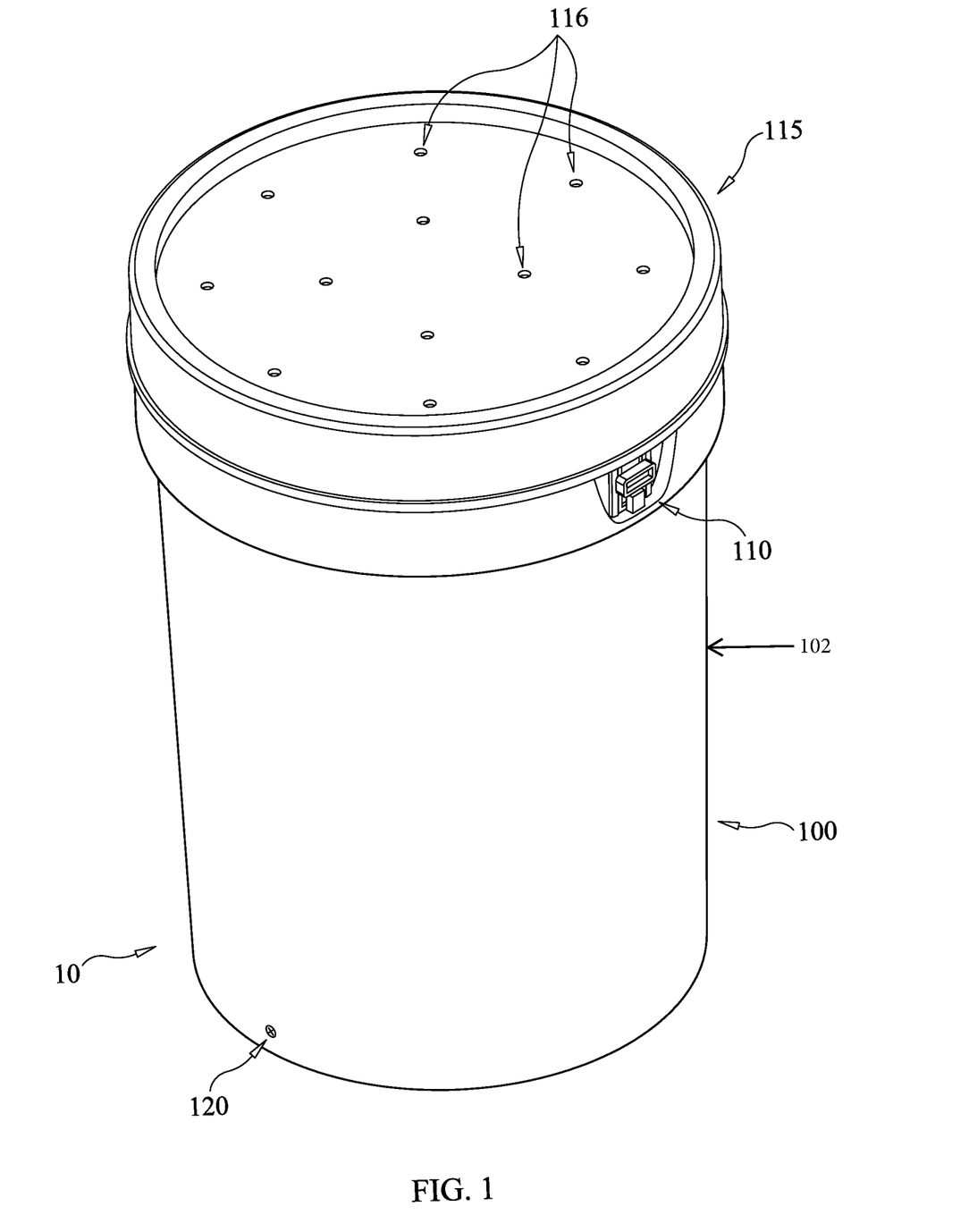
FIG. 1 is an illustration of a utility cleaner according to one embodiment of the present invention.
Figure 2:
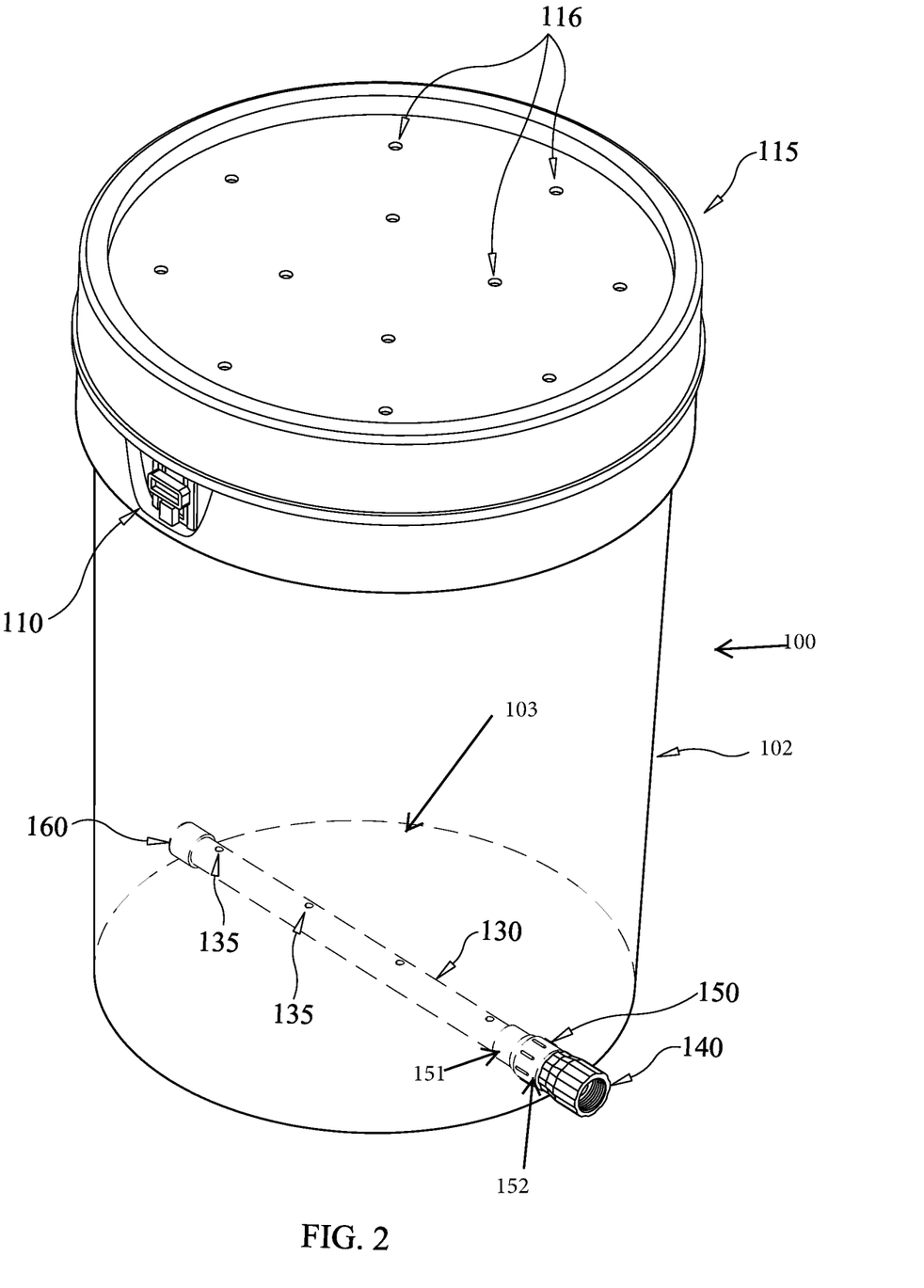
FIG. 2 is another illustration of the embodiment of FIG. 1.
Figure 3:
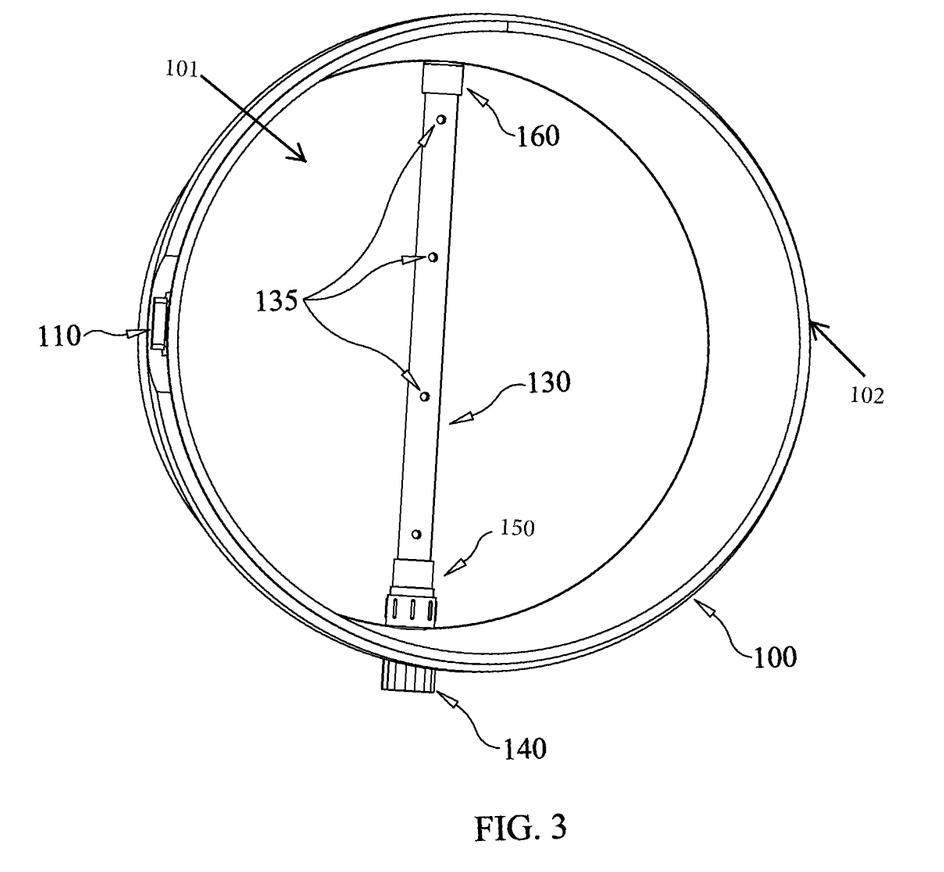
FIG. 3 is an overhead illustration of the embodiment of FIG. 1.
Figure 4:
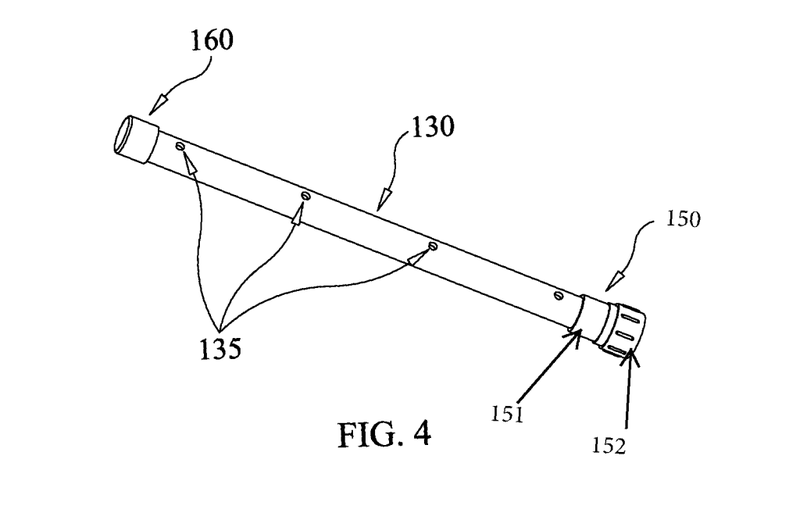
FIG. 4 is an illustration of a close up view of one component of the present invention.
Figure 5A:
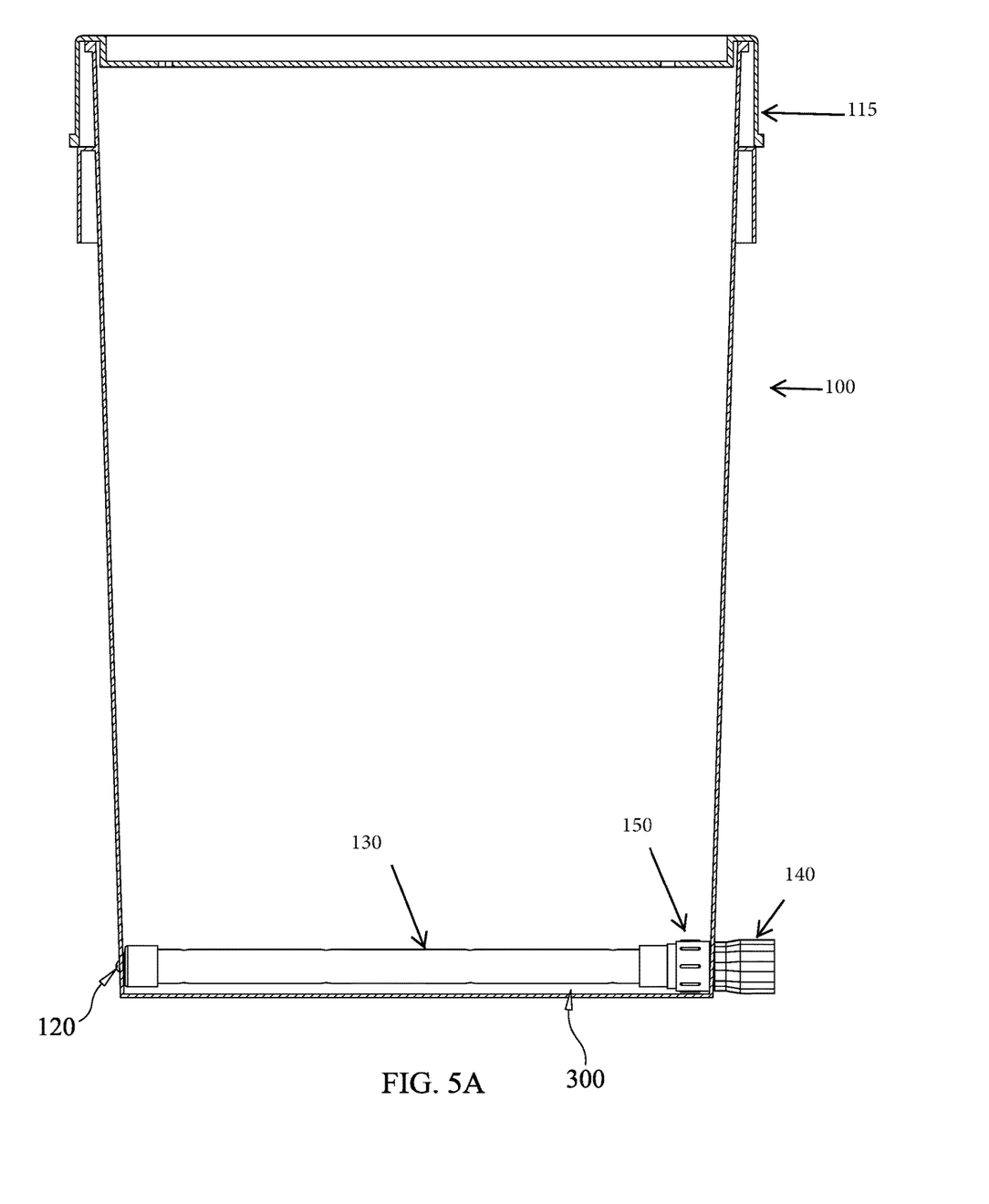
FIG. 5A is a cross-sectional illustration of one embodiment of the present invention.
Figure 5B:
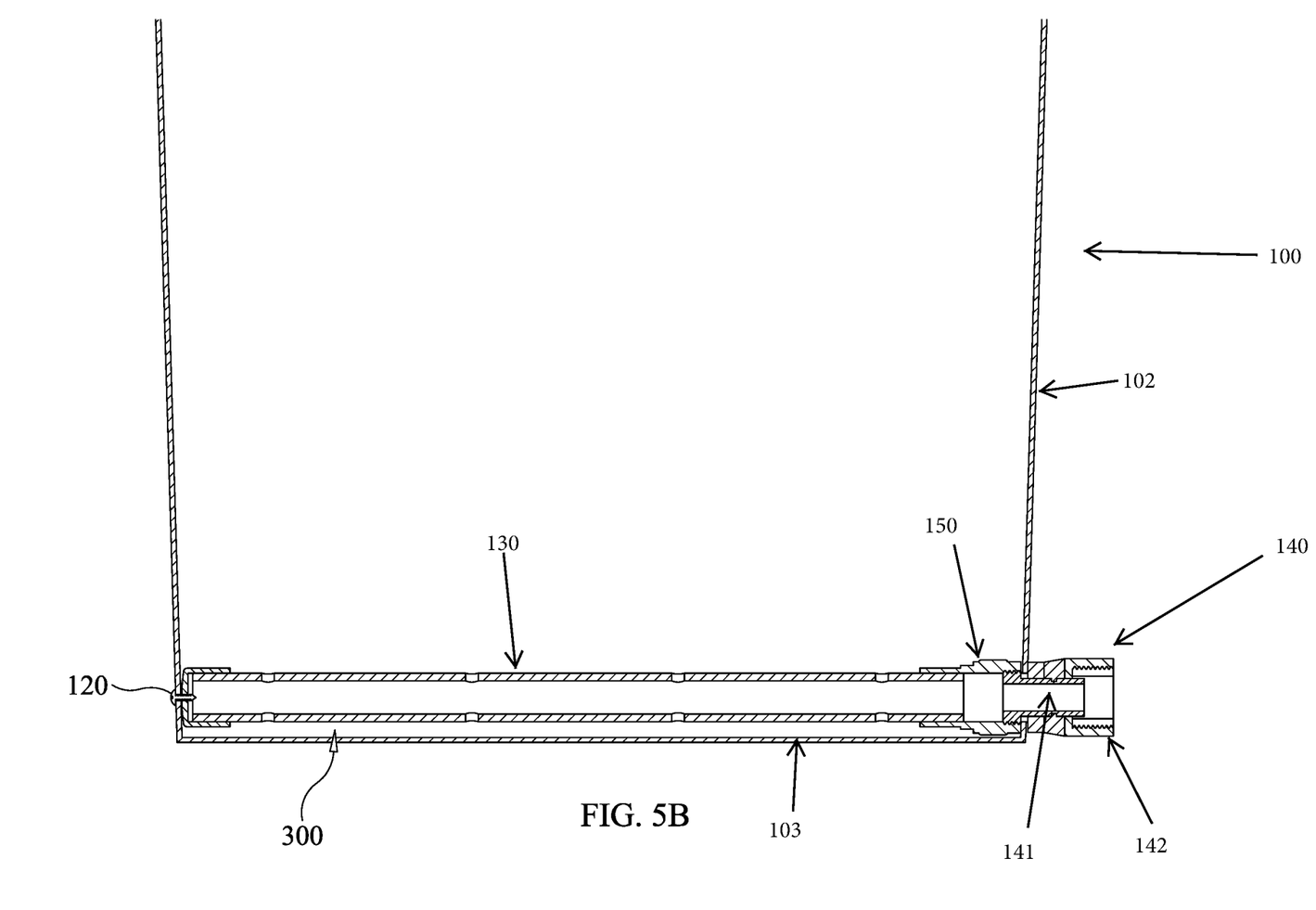
FIG. 5B is another cross-sectional illustration of one embodiment of the present invention.
Figure 6:
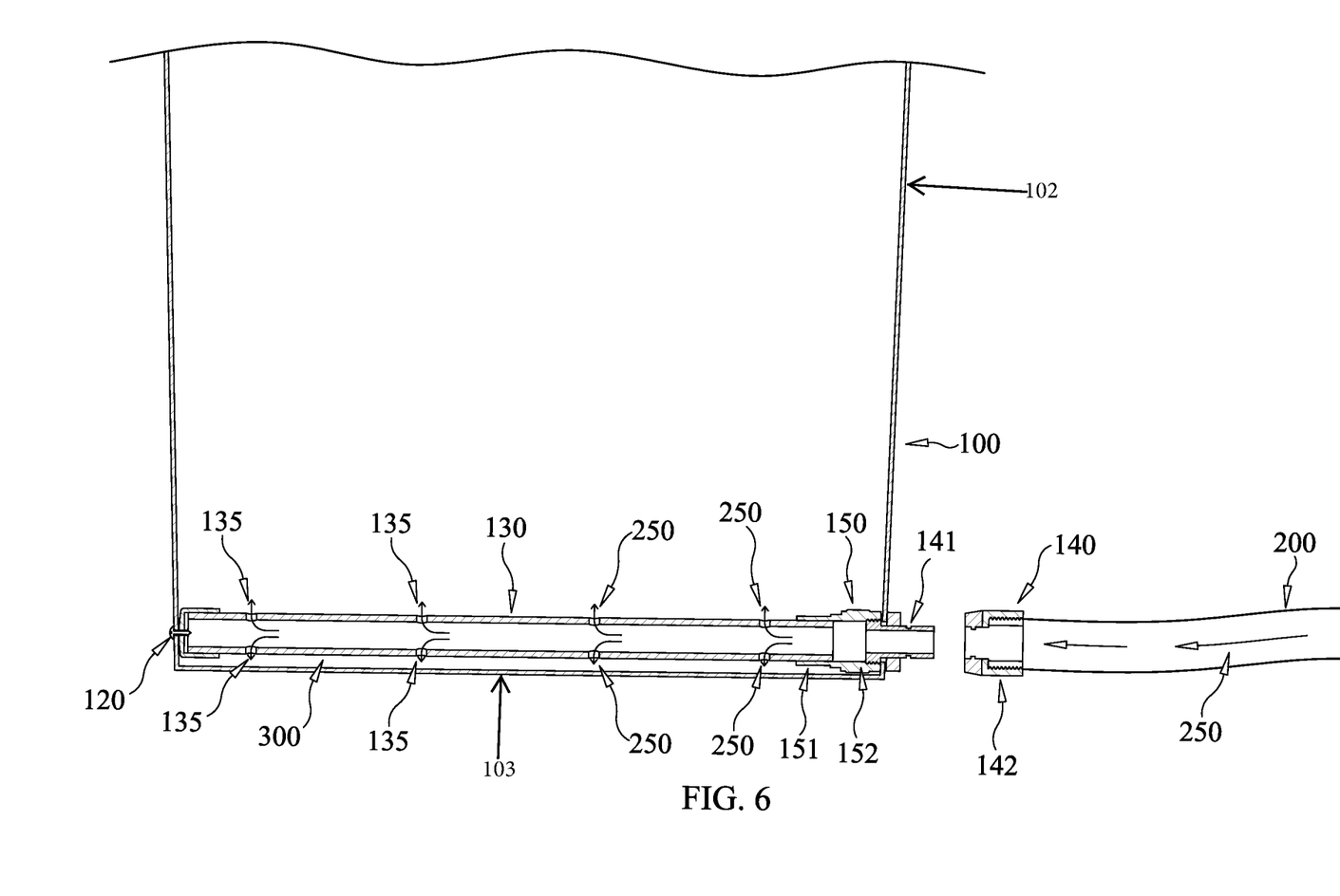
FIG. 6 is another cross-sectional illustration of one embodiment of the present invention.
Figure 7:
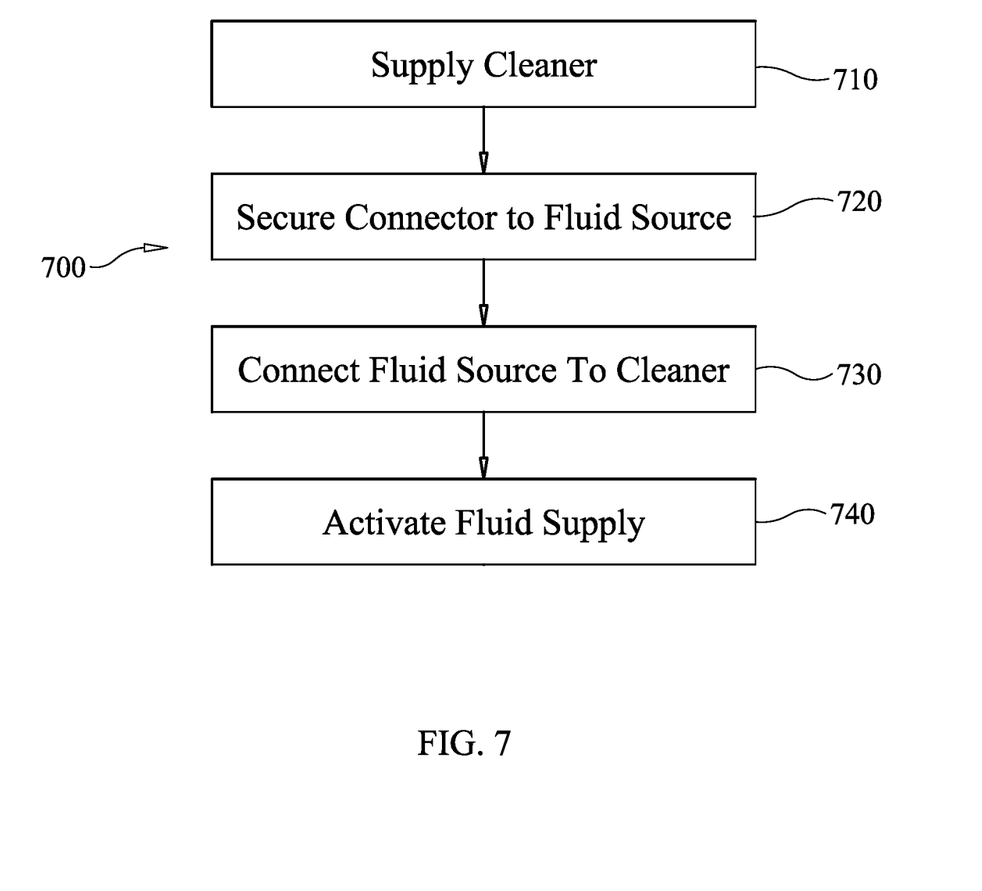
FIG. 7 is a flowchart illustrating an overview flow of the steps implemented to use the present invention.

The present invention is directed to a utility cleaner and method of using the utility cleaner. FIGS. 1, 2, and 3 illustrate a view of one embodiment of the present invention. FIG. 4 illustrates a close-up view of a certain component of the present invention and FIGS. 5A, 5B, and 6 illustrate cross-sectional views of the present invention and FIG. 7 illustrates a flow chart for a method of using the present invention.

The present invention allows items to be cleaned by forcing liquids over and around the items to cleanse the items without damaging the items. In a preferred embodiment, an external liquid source such as water supplied from a hose is connected to the cleaner and will flow into the cleaner to clean the items placed in the cleaner.

FIGS. 1, 2, and 3 illustrate a perspective view of an embodiment of utility cleaner 10. Utility cleaner 10 of FIGS. 1, 2, and 3 includes bucket member 100 having an open top 101, a continuous side member 102, and a flat bottom 103. In one embodiment as illustrated in FIGS. 1, 2, and 3, bucket member 100 is a vertical cylinder. However, the present invention is not limited to a vertical cylindrical shape as in other embodiments, bucket member 100 may be configured in different shapes, such as a square shape, a rectangular shape, triangular shape, or any other shape. As shown in FIGS. 1, 2, and 3 utility cleaner 10 may also include locking mechanism 110, lid member 115, fastening member 120, pipe member 130, connecters 140 and 150, and cap 160. Bucket member 100 is preferably shaped as a circular bucket or cylindrical open container that can hold liquids and/or other materials. Bucket member 100 may be any size and is not limited to any particular size; in a preferred embodiment, bucker member 100 is a 10-14 gallon capacity bucket. In one embodiment, bucket member 100 may also comprise locking mechanism 110 that functions to lock and/or secure lid member 115 to bucket member 100. However, the present invention may be configured without locking mechanism 110. Lid 115 is a member that functions to close off open top 101 of bucket member 100 and contain items placed within bucket member 100.

Holes 116 are a series of holes placed in lid 115 that extend through lid 115 and provide a passage out of bucket member 100 for items that are capable of exiting holes 116. In a preferred embodiment, when a liquid source, such as water from a hose, is connected and supplied to the cleaner, the water will enter bucket member 100 and fill up bucket member and eventually rise up and out of bucket member 100 through holes 116. The size of holes 116 may be the same for every hole 116 or holes 116 may be different sizes. Holes 116 are beneficial as they provide a means for substances such as air or liquids to exit out of bucket member 100 when lid 115 is fastened onto bucket member 100. As illustrated in FIG. 2, holes 116 may be scattered and arranged in a circular pattern over lid 115. However, the present invention is not limited to such pattern and alternative embodiments may have holes 116 arranged in different locations in lid 115. In alternative embodiments, the present invention may be configured with slots in lid 115 instead of holes 116 or may include a combination of slots and holes.

In one embodiment, bucket member 100 may be configured so that it comprises male threads near the top of bucket member 100 and lid member 115 may comprise female threads so that lid member 115 may be secured to bucket member 100 with the male/female threads. However, the present invention is not limited to the use of threads as alternative embodiments may be configured with other fastening means for securing lid 115 to bucket 100, such as gamma seals or other male/female connections.

In one embodiment, fastening member 120 acts to secure pipe member 130 to bucket member 100 and acts to keep pipe member 130 in a stationary position within bucket member 100. In a preferred embodiment, fastening member 120 is a screw that is screwed into and through the wall of bucket member 100 and then into cap 160. As illustrated in FIGS. 5A, 5B, and 6, fastening member 120 screws into cap 160 and assists in holding pipe member 130 in a fixed position inside of bucket member 100 so that pipe member 130 is preferably positioned and located above the bottom/floor of bucket 100 so that a space 300 exists between pipe member 130 and the bottom of bucket member 100. The configuration and location of pipe member 130 is not limited to any specific location and the size of space 300 may vary in different embodiments. In one embodiment, bucket member 100 may be made of plastic. In alternative embodiments, bucket member 100 may be made of alternative materials such as metal, fiberglass, HDPE, PVC, metal or other materials.

As illustrated in FIGS. 2-4, pipe member 130 is a cylindrical shaped member capable of conveying fluid substances or other materials. In one embodiment, one end of pipe member 130 is closed off with cap member 160. Cap member 160 is a cap that is sized to fit securely over pipe member 130 and functions to seal off pipe member 130. Holes 135 are a series of holes in pipe member 130 that extend through the surface of pipe member 130 and provide a pathway out of pipe member 130 so that substances flowing inside of pipe member 130, such as water from a water source, may exit out of pipe member 130 via holes 135. The size of holes 135 may be the same for every hole 135 or holes 135 may be different sizes. Holes 135 are beneficial as they provide a means for substances such as air or liquids to exit out of pipe member 130 when pipe member is capped with cap 160. As illustrated in FIGS. 2, 3, 4, and 6 holes 135 may be arranged in a linear configuration down the length of pipe member 130. Pipe member 130 may be any number of different sizes and is not limited to any particular size. In one embodiment, pipe member 130 may be a ½ inch, 1 inch, ¾ inch or and may be larger or smaller in other embodiments depending on the configuration and size of the remaining components.

In one embodiment, as illustrated in FIG. 6, holes 135 may also be located on the bottom side of pipe member 130 so that substances flowing out of holes 135 may flow out of the bottom of pipe member 130 into space 300. Such a configuration is beneficial as the flow of substances out of any holes 135 on the bottom of pipe member 135 allows the flow to hit the bottom of bucket 100 to reduce the force of substances coming out of pipe member 130 which in turn limits the force that is ultimately applied to items being cleaned within bucket 100. However, the present invention is not limited to such pattern and alternative embodiments may have holes 135 arranged in different locations around pipe member 130. The present invention is not limited to receiving water flowing into and through cleaner 10 as any number of liquids may be supplied to cleaner 10, such as liquid soaps, detergents, and the like.

Connector 150 is fastened to the end of the pipe member 130 that is opposite of cap member 160 as illustrated in FIGS. 2, 3, and 4. In one embodiment of the present invention, connector 150 is an adapter that may be configured with an end 151 that is configured as a glue connection with no threads that is sized to slide over and onto pipe member 130 and be glued to or fastened to pipe member 130. In such an embodiment, end 152 of connector 150 may be configured with female threads that is configured to receive threads from connector 140. In one embodiment, pipe member 130, cap member 160, and connector 150 may be made of plastic. However the present invention is not limited to plastic as in alternative embodiments, pipe member 130, cap member 160, and/or connector 150 may be made of any number of alternative materials such as metal, fiberglass, HDPE, PVC, or other materials.

Connector 140 of the present invention functions to attach and/or secure to connector 150 and pass through and extend out of bucket member 100. As illustrated in FIGS. 5B and 6, connector 140 is configured with a male member 141 and a female member 142. In a preferred embodiment, connector 140 is some type of quick connect two part coupling to provide for an easy and fast connection between male member 141 of connector 140 and female member 142 of connector 140. In one embodiment as illustrated in FIGS. 5B and 6, male member 141 of connector 140 may be a stud member with threads on one end and a barbed or push to connect configuration on the other end. As illustrated in FIG. 6, the threaded end of male member 141 is positioned on the inside of bucket member 100 and screws into end 152 of connector 150. By screwing into end 152 of connector 150, a continuous pathway is provided into pipe member 130 from male member 141 of connector 140 to connector 150 and to pipe member 130. With the threaded end of male member 141 screwed into end 152 of connector 150, the barbed end of male member 141 will extend out of bucket member 100 through a hole or opening in bucket member 100 so that the barbed end is exposed outside of bucket member 100. In such an embodiment, male member 141 of connector 140 is preferably configured with a gasket member that is configured so that it will be up against the inside wall of bucket member 100 around the hole in bucker member 100 where male member 141 extends out of bucket member 100 to seal off the opening in bucket member 100 so that there can be no leakage out of bucket member 100 where male member 141 extrudes out of bucket member 100. The gasket may be located up against the outside wall of bucket member 100 in other embodiments instead of being located against the inside wall of bucket member and the present invention may be configured so that male member 141 includes two gaskets one against the inside wall and one against the outside wall to prevent leakage out of bucket member 100. In alternative embodiment, some type of glue, silicone, or other substance may be used along with the gasket to help seal off the hole or opening in bucket member 100 where male member 141 extends out of the bucket member 100 for the purpose of preventing leaks out of bucket member 100.

Female member 142 of connector 140 is configured in one embodiment as a coupling with two ends having female threads on one end and a quick connect configuration on the other end. In such an embodiment, the female-threaded end of female member 142 is configured to fit over and screw onto any number of threaded members such as a garden hose to supply a liquid source to the present invention. In one embodiment as illustrated in FIG. 6, the female-threaded end of female member 142 is configured with garden hose threads that screw onto hose 200 with the quick connect end of female member 142 pushed onto and connected to the barbed end of male member 141 of connector 140 that extends out of bucket member 100. While 142 may be configured with garden hose thread, female member 142 may have different threads in a different embodiment, such as national pipe tapered threads. This connection of connector 140 to connector 150 establishes a solid and continuous pathway between hose 200 into pipe member 130. In one embodiment, connector 140 may be made of brass. However the present invention is not limited to brass as in alternative embodiments, connector 140 may be made of any number of alternative materials such as copper, PVC, plastic, aluminum, stainless steel, metal, or other materials.

The present invention is configured so that some source of liquid, such as water from a hose, is supplied into utility cleaner 10 through connectors 140, 150, and pipe member 130. The liquid will flow from the source, such as a water hose, through connector 140, through connector 150, into and through pipe member 130, out of holes 135, into bucket member 100, over and around any contents in bucket member 100, and eventually out of cleaner 10 through holes 116 in lid 115. The arrangement and location of pipe member 130 and holes 135 allows liquids to be forced out of pipe member 130 at a reduced pressure so as not to damage items in bucket 100, such as softer and more fragile produce and vegetables such as blackberries, blue berries, and also prevents increased death or crustaceans being cleaned, such as crawfish and prevents the need to purge the crustaceans with a salt-water bath.

Cleaner 10 is also configured so that once lid 115 is secured to bucket member 100 and a liquid source is supplied to cleaner 10, no additional hands-on support is needed by a user. With lid 115 secured to bucket member 100, fluids and liquids forced into the cleaner via pipe member 130 can only escape via holes 116. As illustrated in FIG. 6, in a preferred embodiment, once lid 115 is secured to bucket member 100, liquids flowing into bucket member 100 as illustrated by liquid flow arrows 250 will continue to flow into pipe member 130, out of holes 135, into bucket member 100 and continue to flow into bucket member 100 filling up bucket member 100 until bucket member 100 is completely filled with the fluid brought into bucket member 100 and the contents being cleaned within bucket member 100. As fluid continues to flow, as illustrated by flow arrows 250, in bucket member 100, the constant flow of liquid will force liquid up and over and around any contents of bucket member 100 and eventually out of bucket member 100 via holes 116. This flow pattern over and around the contents will clean the items within bucket member 100 at a reduced flow rate/pressure to minimize damage to the contents of bucket member 100 and in a manner that a user does not have to constantly tend to utility cleaner 10. Rather, a user can perform other tasks while items are being cleaned in cleaner 10.

As liquid continues to flow into cleaner 10, the liquid will flow over any contents and move dirt particles off of the contents and disburse those dirt particles in the fluid content that is within bucket member 100 and will eventually be forced out of bucket member 100 through holes 116. A user can simply visually observe the fluid being forced out of holes 116 and observe the nature of the liquid flowing out of holes 116. A user may determine when articles in cleaner 10 have been cleaned by observing the content of dirt within liquids, such as water, being forced out of holes 116. When the liquid flowing out of holes 116 appears clear with a reduced or minimal dirt content, the articles/items in bucket 100 have been cleaned such that a user can reduce or stop the liquid supply into cleaner 10. By merely having to visually review the liquid flowing out of holes 116, the user is free to perform other tasks while the contents in bucket member 100 are being cleaned.

FIG. 7 is a flowchart illustrating an overview flow of the steps implemented to clean an item using the utility cleaner 10. In particular, flow 700 represents a method in one embodiment of the present invention for cleaning an item using the utility cleaner. In block 710, a utility cleaner, such as the utility cleaner 10 discussed herein, is provided. After the utility cleaner is provided, flow 700 proceeds out of block 710 and then to block 720.

In block 720, a connector, such as connector 140 is connected to a fluid source such as a water source. In one embodiment, the female member 142 of connector 140 is connected to a water hose. After female member 142 of connector 140 is connected to a fluid source, flow 700 proceeds out of block 720 and then to block 730. In block 730, the fluid source with the female member 142 of connector 140 is secured/connected to male member 141 of connector 140. In connecting female member 142 to male member 141, the fluid source is connected to cleaner 10.

After the fluid source, such as hose 200 of FIG. 6, is connected to the cleaner 10 via the connection of female member 142 to male member 141 of connector 140, flow 700 proceeds out of block 730 and then to block 740. In block 740, the fluid source, such as hose 200, is activated so that a flow of liquid, such as water from a hose, is supplied and flows into cleaner 10 and eventually flows through pipe member 130, out of holes 135 in bucket member 100 and eventually over any contents in bucket member 100 and out of bucket member 100 via holes 116 in lid 115.

Although the present invention and its advantages have been described in detail, it should be understood that various changes, substitutions and alterations can be made herein without departing from the invention. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized.

What is claimed is:

1. A utility cleaner comprising:
   a bucket member with an open top, a continuous side member, and a flat bottom;
   a lid wherein said lid attaches to the top of said bucket member and comprises a plurality of holes extending through said lid;
   a pipe member with two ends wherein said pipe member comprises:
      a plurality of holes; and
      a cap wherein said cap seals one of said ends of said pipe;
   a fastener for holding said pipe member to said bucket member wherein said fastener extends into and through said continuous side member and into said cap;
   a first connector attached to said end of said pipe without said cap; and
   a second connector attached to said first connector.

2. The utility cleaner of claim 1 further comprising a locking mechanism for locking said lid to said bucket member.

3. The utility cleaner of claim 1 wherein said bucket member is cylindrical.

4. The utility cleaner of claim 1 wherein said pipe member is located inside of said bucket member.

5. The utility cleaner of claim 4 wherein said fastener holds said pipe member in a fixed position above said bottom of said bucket member.

6. The utility cleaner of claim 5 wherein said second connector comprises a male member and a female member wherein said male member connects to said first connector and extends through said side member of said bucket member.

7. The utility cleaner of claim 6 wherein said female member of said second connector comprises a first end and a second end wherein said first end is configured to connect to said male member of said second connector.

8. The utility cleaner of claim 7 wherein said second end of said female member of said second connector is threaded with garden hose threads.

9. A cleaner comprising:
   a cylindrical bucket member with an open top and a flat bottom;
   a lid wherein said lid attaches to the top of said bucket member and comprises a plurality of holes extending through said lid;
   a pipe member located within said bucket member with two ends wherein said pipe member comprises:
      a plurality of holes; and
      a cap wherein said cap seals one of said ends of said pipe;
   a first connector attached to said end of said pipe without said cap;
   a second connector attached to said first connector and extending out of said bucket; and
   a fastener for holding said pipe member in a fixed position above said bottom of said bucket member wherein said fastener extends through said bucket member and into said cap.

10. The cleaner of claim 9 wherein said second connector is a quick-connect connector.

11. The cleaner of claim 10 wherein said first connector is an adapter with a first end and a second end whereby said first end is configured to slide over and onto said pipe member.

12. The cleaner of claim 11 wherein said second end of said adapter contains female threads that is configured to receive said second connector.

* * * * *